US 8,521,129 B2

(12) United States Patent
Gudlavenkatasiva et al.

(10) Patent No.: US 8,521,129 B2
(45) Date of Patent: Aug. 27, 2013

(54) ADAPTIVE PRICING SERVICE PLAN

(75) Inventors: Bhaskar R. Gudlavenkatasiva, Tampa, FL (US); George L. Hughes, Wesley Chapel, FL (US); Nityanand Sharma, Tampa, FL (US); Umashankar Velusamy, Tampa, FL (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 99 days.

(21) Appl. No.: 13/169,198

(22) Filed: Jun. 27, 2011

(65) Prior Publication Data

US 2012/0329424 A1 Dec. 27, 2012

(51) Int. Cl.
*H04M 11/00* (2006.01)

(52) U.S. Cl.
USPC ............ 455/406; 455/405; 455/407; 455/408

(58) Field of Classification Search
USPC .................................. 455/405, 406, 407, 408
See application file for complete search history.

(56) References Cited

U.S. PATENT DOCUMENTS

| | | | |
|---|---|---|---|
| 6,532,366 B1* | 3/2003 | Chung et al. .................. | 455/445 |
| 7,986,935 B1* | 7/2011 | D'Souza et al. .............. | 455/406 |
| 2005/0105467 A1* | 5/2005 | True et al. ..................... | 370/235 |
| 2006/0063510 A1* | 3/2006 | Wills et al. .................... | 455/406 |
| 2006/0111079 A1* | 5/2006 | Tischer et al. ................ | 455/406 |
| 2008/0014904 A1* | 1/2008 | Crimi et al. ................... | 455/406 |
| 2008/0119163 A1* | 5/2008 | Marsh et al. .................. | 455/408 |
| 2010/0093309 A1* | 4/2010 | Clayton ........................ | 455/407 |
| 2010/0144310 A1* | 6/2010 | Bedingfield et al. .......... | 455/405 |
| 2012/0142310 A1* | 6/2012 | Pugh et al. .................... | 455/406 |

* cited by examiner

*Primary Examiner* — Barry Taylor (57) ABSTRACT

A method may include enrolling a subscriber device in an adaptive pricing service plan for providing telecommunication service to the subscriber device; associating, with the telecommunication service, a first pricing scheme including a first number of allotted minutes within a current billing cycle; tracking, for the subscriber device within the current billing cycle, cumulative used minutes of the telecommunication service; determining, using a forecasting model and the cumulative used minutes, prospective minutes usage with respect to the first number of allotted minutes for an entirety of the current billing cycle; generating, based on the prospective minutes usage, a recommendation related to a second pricing scheme including a second number of allotted minutes; and sending, within the current billing cycle, the recommendation to the subscriber device.

18 Claims, 8 Drawing Sheets

ADAPTIVE PRICING SERVICE PLAN

BACKGROUND

Content providers offer media content and service providers offer communication services, to subscribers, subject to the terms of a pricing plan that is in effect at the start of a billing cycle (e.g., one month). For voice plans, for example, multi-tiered minute-based plans typically include a set range of "anytime minutes"—that a subscriber estimates will be used—at a fixed fee. When the set number of anytime minutes has been exhausted, a per-minute charge is assessed for the remainder of the billing cycle.

Subscribers who experience a substantial discrepancy between the estimated usage and the actual usage are typically not allowed the flexibility to change pricing plans once the billing cycle has begun. For subscribers whose phone usage is subject to unpredictable fluctuations, inflexible plans such as these offer the subscriber a choice between the risk of overpayment (under-use of anytime minutes, i.e., "leftover minutes") or incurring costly per-minute charges for minutes in excess of the set number of anytime minutes.

DETAILED DESCRIPTION OF PREFERRED EMBODIMENTS

The following detailed description refers to the accompanying drawings. The same reference numbers in different drawings may identify the same or similar elements. Also, the following detailed description does not limit the invention.

The term "network," as used herein, is intended to be broadly interpreted to include a wireless network (e.g., mobile network, cellular network, non-cellular network, etc.) and/or a wired network. In this regard, the embodiments described herein may be implemented within a variety of network types, such as, for example, a Global System for Mobile Communications (GSM) network, a Universal Mobile Telecommunication System (UMTS) network, a Wideband Code Division Multiple Access (WCDMA) network, an Ultra Mobile Broadband (UMB) network, a High-Speed Packet Access (HSPA) network, a Worldwide Interoperability for Microwave Access (WiMAX) network, an Institute of Electrical and Electronics Engineers (IEEE) 802.X network, an Evolution Data Optimized (EV-DO) network, a Long Term Evolution (LTE) network, an evolved High Rate Packet Data (eHRPD) network, and/or another type of wireless network (e.g., an ad hoc network, etc.), or some other type of wired network.

Figure 1:
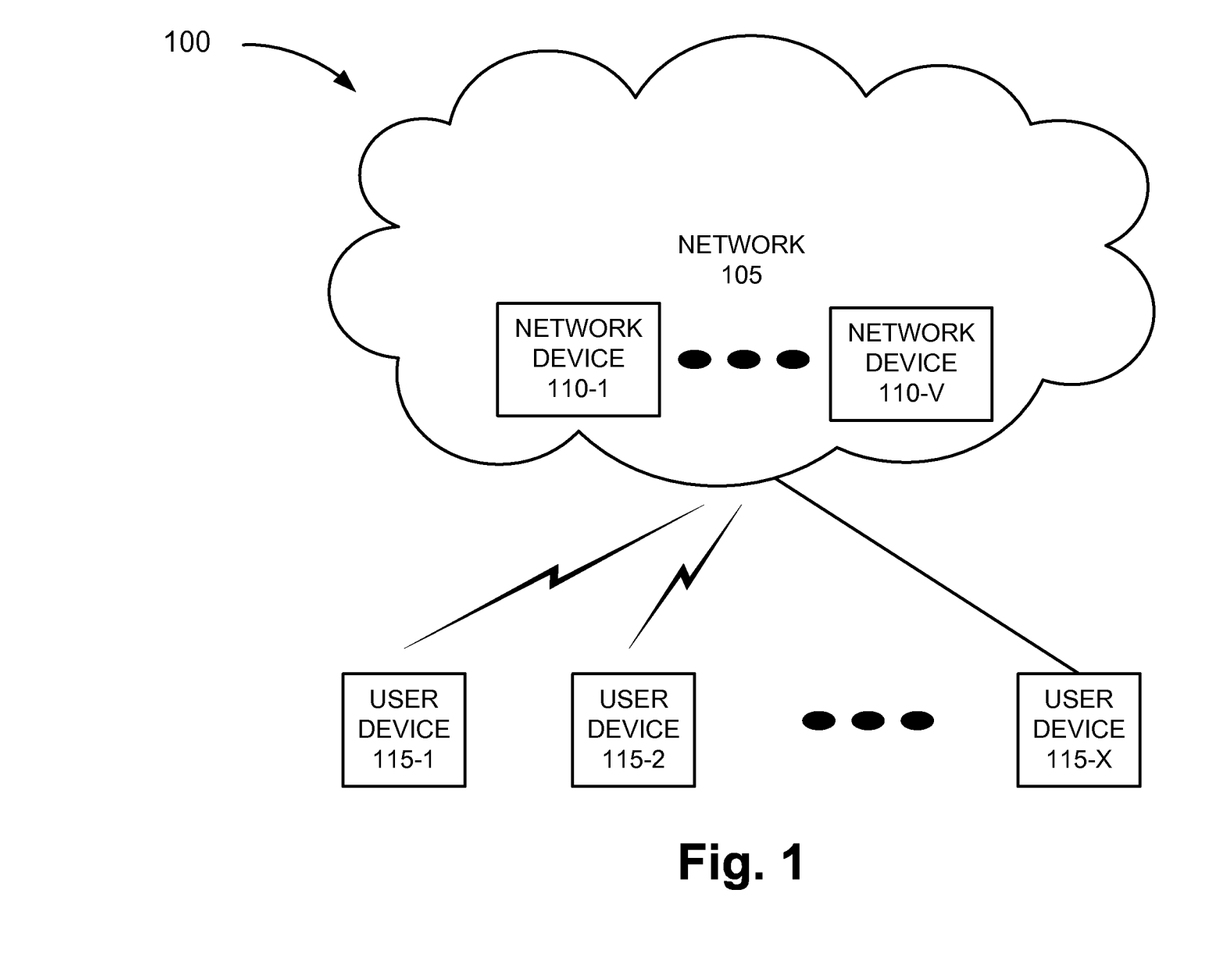
FIG. 1 is a diagram illustrating an exemplary environment in which providing recommendations based on cumulative usage information may be implemented.

FIG. 1 is a diagram illustrating an exemplary environment 100 in which various embodiments described herein may be implemented. As illustrated, exemplary environment 100 may include a network 105 including network devices 110-1 through 110-V (referred to collectively as network devices 110 or individually as network device 110), and user devices 115-1 through 115-X (referred to collectively as user devices 115 or individually as user device 115).

Network 105 may include one or multiple networks of one or multiple types. Network 105 may provide access to various content, applications, and/or services to subscribers or customers. Network devices 110 may include one or multiple network devices that provide adaptive pricing service plans to customers based on application and/or service usage information, as described herein. In one embodiment, network device(s) 110 may include a network service provider configured to provide digital media content and/or communication services.

Communication services may include voice communication (e.g., VoIP), a short message service (SMS) communication, and/or a multimedia messaging service (MMS) communication or any other type of communication. Other types of communication services may include downloading of content (e.g., videos, etc.) from a web site on a network, downloading audio files (e.g., music), and/or downloading other types of data, for example, for use in a cell phone.

User device 115 may include a device configured to communicate with other devices, systems, networks, and/or the like. In practice, user device 115 may correspond to a stationary device, a portable device, a handheld device, a mobile device, a vehicle-based device, or some other type of user device. As an example, user device 115 may correspond to a wireless telephone, a computer (e.g., a desktop, a laptop, a palmtop, a netbook, a tablet, etc.), a personal digital assistant (PDA), a personal communication system (PCS) terminal, a gaming console, a music playing device, a video playing device, a location-aware device, and/or a television. User device 115 may operate according to one or multiple communication standards, protocols, etc. User device 115 may communicate via a wireless connection and/or via a wired connection.

According to exemplary embodiments, network devices 110 may perform tracking of cumulative usage (e.g., of minutes) of applications and/or services by subscriber devices (e.g., user devices 115). Based on the tracked cumulative usage information, network devices 110 may generate service-related and/or pricing plan-related recommendations (referred to as "recommendations" or "recommendation"). Network devices 110 may provide the recommendations to the subscribers via the respective subscriber devices and/or via another device(s) associated with the subscribers.

The usage and/or recommendations may pertain to a television service, an Internet service, a mobile service, a telephone service, and/or an application used by the subscribers via the service. As an example, the recommendations may include a recommendation of a service plan, a particular product, a service or an application control option, cumulative usage information, and/or other status information pertaining to the customers' usage. According to an exemplary embodiment, the recommendations may be generated based on information, in addition to and/or instead of cumulative usage information, such as, for example, date, time, or other metadata associated with the usage of the application and/or service, a transaction, and/or an event. For example, the recommendation may correspond to a particular identifier associated with one or more calls received at and/or placed by user device 115.

According to an exemplary embodiment, network devices 110 may use access point names (APN) to organize applications and/or services for tracking cumulative usage and generating cumulative usage information. For example, there may be applications and/or services in which tracking of cumulative usage may be in terms of amount of data (e.g., number of bits, number of bytes, etc.), duration (e.g., number of minutes, etc.), transactions (e.g., number of messages (e.g., Short Messaging Service (SMS) messages, Multimedia Messaging Service (MMS) messages, etc.), number of downloads and/or uploads (e.g., music, pictures, video, etc.)), and/or other types of tracking that may be attributed to a particular application and/or service.

According to other embodiments, network devices 110 may use other types of tracking, such as, for example, protocol used (e.g., Session Initiation Protocol (SIP), etc.), system used (e.g., Internet Protocol Multimedia Subsystem (IMS), etc.), other attributes pertaining to the application and/or the service, other attributes pertaining to a service plan associated with the application and/or the service, etc., to organize the tracking of cumulative usage pertaining to applications and/or services and generating cumulative usage information. According to an exemplary embodiment, the type of tracking may be based on network tracking policies.

FIGS. 2A-2E are diagrams illustrating an exemplary process in which an adaptive pricing service plan for an application and/or a service may be implemented, by a service provider associated with network devices 110, for a subscriber device based on in-cycle, application and/or service usage information. Referring to the examples shown in FIGS. 2A-2E, a customer may enroll in the adaptive pricing service plan, thereby allowing the subscriber access to network 105 for voice services via user device 115-X. In one example, a recurring enrollment or subscription fee may be imposed on the customer for enrollment in the adaptive pricing service plan.

User device 115-X may be directed to a particular APN (e.g., based on a client application residing in user device 115-X, interaction with network 105, or some other method) and a communication session may be established for the subscriber to access and/or use the application and/or service in a current billing cycle. In this example, the adaptive pricing service plan may offer a multi-tiered pricing plan that includes a first pricing tier, a second pricing tier, and a third pricing tier. For example, the first pricing tier may include up to 200 "anytime" or airtime minutes, per month, at a flat fee of $30; the second pricing tier may include 400 airtime minutes for a $40 flat fee; and the third pricing tier may include 600 airtime minutes for a $50 flat fee. Each of the pricing tiers may have a $0.50 per minute charge applicable to additional minutes.

Figure 2A:
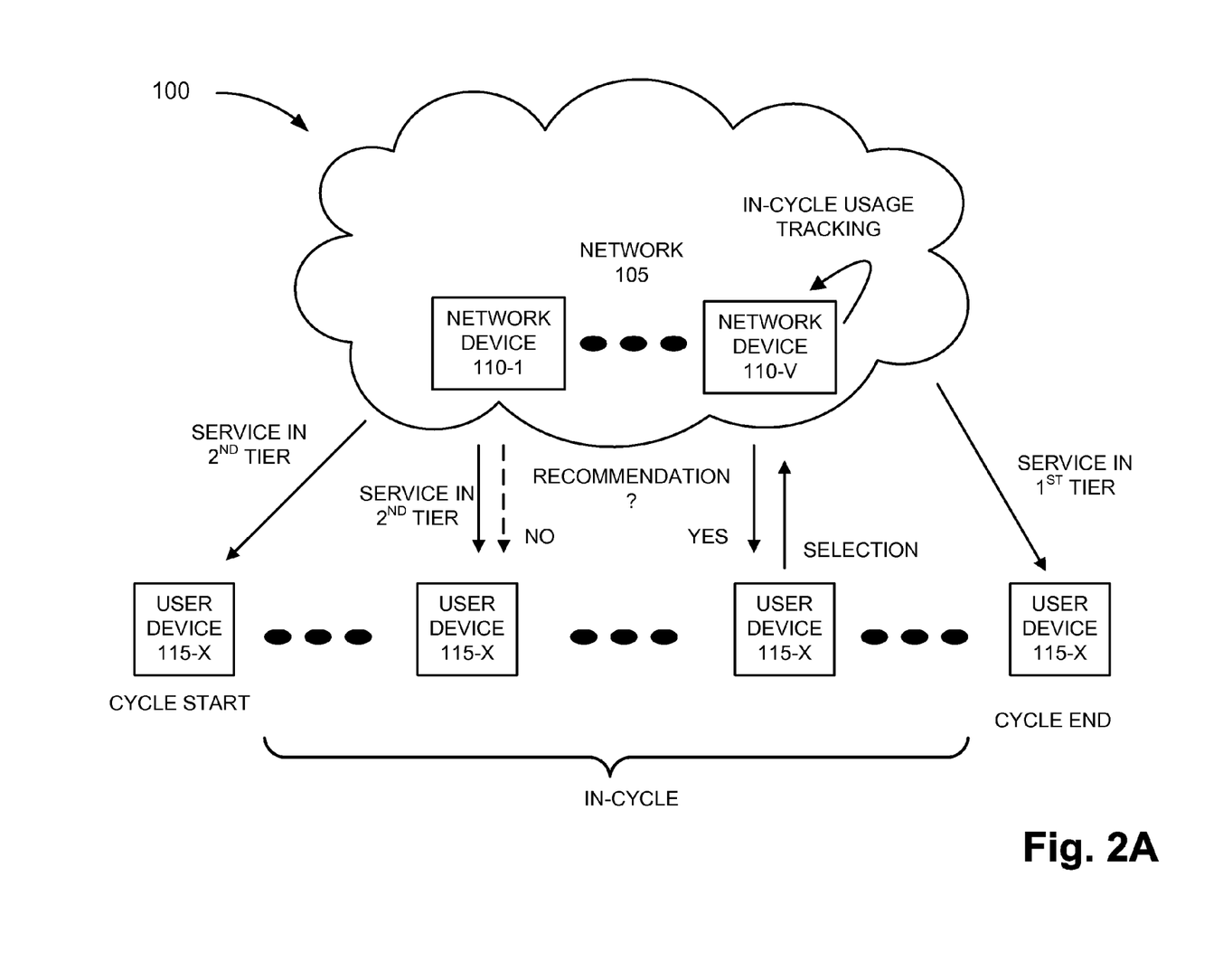
FIGS. 2A-2E are diagrams illustrating an exemplary process in which recommendations may be provided to customers based on cumulative usage information.

Referring to FIG. 2A, assume that the customer has signed up for the second pricing tier corresponding to a range of 201-400 airtime minutes of service (represented by a downward arrow). At the start of a first billing cycle, network device(s) 110 may perform cumulative tracking of user device 115-X's usage of the allotted airtime minutes.

At a given point in the first billing cycle (e.g., 10 days), network device(s) 110 may determine—based on cumulative usage information (e.g., 100 min) generated from the in-cycle tracking—that device 115-X is presently on pace (e.g., 10 min/day) to use a total of 300 airtime minutes over the course of the first billing cycle (e.g., 30 days*10 min/day), which is within the current range (200-400 airtime minutes allowed) of the second pricing tier, which was in effect at the beginning of the first billing cycle. Based on the calculated usage rate, network device(s) 110 may make a determination not to generate a recommendation (represented by a dashed downward arrow labeled "NO").

At a later point in the first billing cycle (e.g., 15 days), network device(s) 110 may determine—based on updated cumulative usage information (e.g., 100 min) generated from the in-cycle tracking—that user device 115-X is presently on pace (e.g., 6.7 min/day) to use a total of 200 airtime minutes over the course of the first billing cycle (e.g., 30 days*6.7 min/day), which is outside the representative range (201-400) of the second pricing tier currently in effect. Based on the updated usage rate, network device(s) 110 may make a determination to generate a recommendation (represented by a solid downward arrow labeled "YES").

For example, network device(s) 110 may identify one or more options applicable to device 115-X, based on the terms prescribed in the adaptive pricing service plan and, for example, network policies. The recommendation may include, for example, one or more of a balance remaining (e.g., corresponding to a cumulative tracking (e.g., in terms of bytes, time, number of transactions, etc.) associated with the customer's current service plan), available next-level service plan(s), to which the customer may make an in-cycle switch, for example, on a temporary (e.g., one-time) or a permanent basis, and/or other service control options (e.g., stop service when the limit is reached, pay-as-you go once limit is reached, apply overage charges after limit is exceeded, etc.). Assume here that the recommendation is for user device 115-X to be switched from the second pricing tier to the first pricing tier for the first billing cycle.

As illustrated in FIG. 2A, network device(s) 110 may present the recommendation to the customer via user device 115-X. The recommendation may be sent to the customer using one or multiple communication means (e.g., SMS message, MMS message, e-mail, voicemail, overlay, interactive bug, pop-up, etc.). In addition, or alternatively, network device(s) 110 may present the recommendation to the customer via another device associated with the customer, for example, as identified in subscription profile associated with the customer.

In the example illustrated in FIG. 2A, the customer may select from one of the recommendations presented (represented by a solid upward arrow). User device 115-X may send the customer's selection to network device(s) 110 and network device(s) 110 may provision the customer's selection. As an example, the customer may make the switch to the first pricing tier on a temporary basis (e.g., for this month and at least the following month).

As illustrated in FIG. 2A, device 115-X may continue to be provided airtime minutes (represented by a solid downward arrow) in the first billing cycle, to be billed by network device(s) 110 at the level of the selected first pricing tier (i.e., $30) to cycle's end. In this example, the customer will have nominally saved $10 (i.e., $40−$30). Where an enrollment fee of $5, for example, is charged for enrollment in the adaptive pricing service plan, the customer will realize a net savings of $5 (i.e., $10−$5) based on the switch in pricing plans.

Figure 2B:
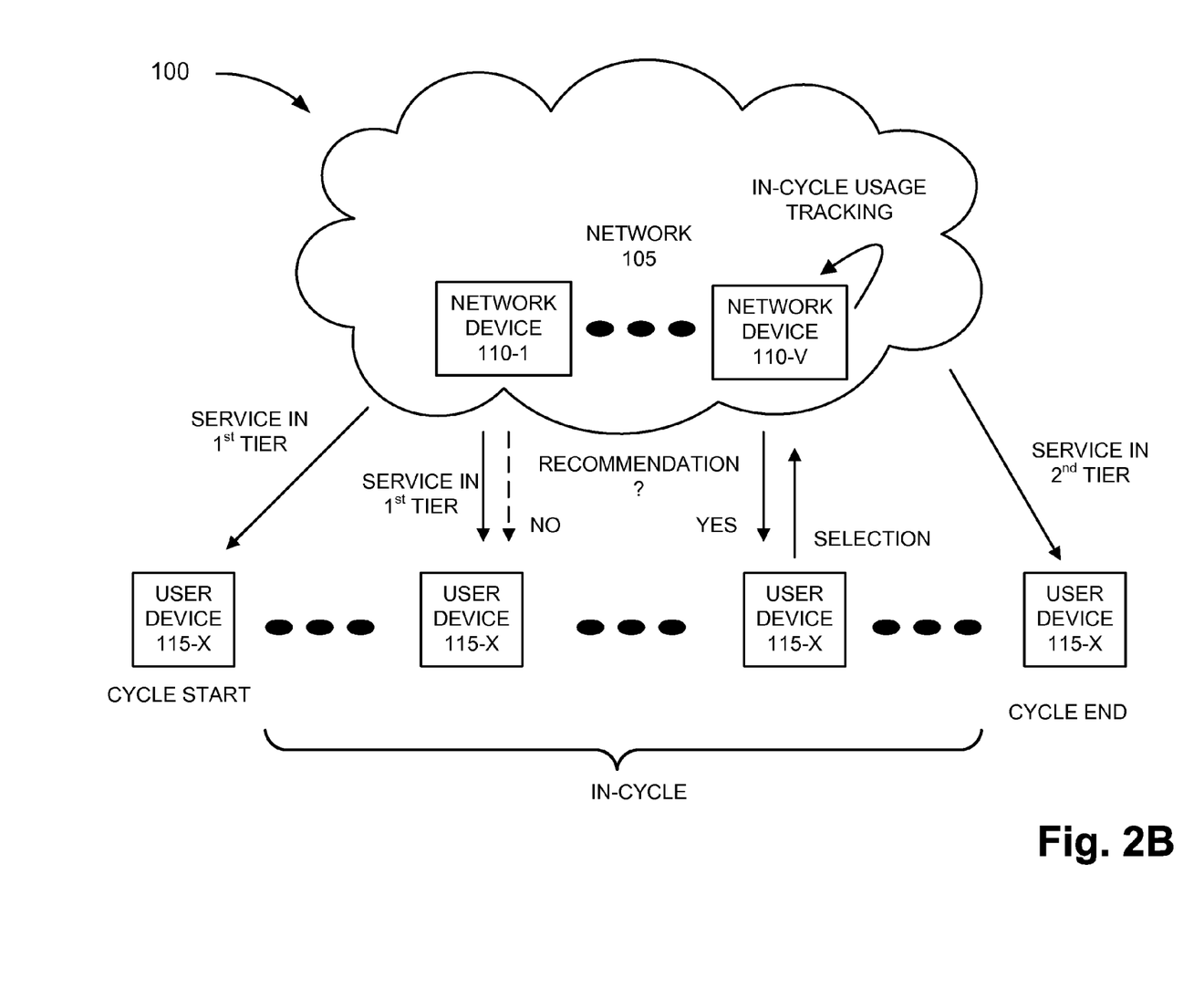

Referring to FIG. 2B, assume the same customer as in the example given in FIG. 2A, and a carryover of the first pricing tier to a subsequent, second billing cycle corresponding to an allotment of <200 airtime minutes of service (represented by a downward arrow). In other embodiments, network device(s) 110 may have automatically reset the pricing plan back to the second pricing tier. At the start of the second billing cycle, network device(s) 110 may again perform cumulative tracking of user device 115-X's usage of the allotted airtime minutes.

At a given point in the second billing cycle (e.g., 10 days), network device(s) 110 may determine—based on cumulative usage information (e.g., 70 min) generated from the in-cycle tracking—that user device 115-X is presently on pace (e.g., 7 min/day) to use a total of 210 airtime minutes over the course of the second billing cycle (e.g., 30 days*7 min/day), which exceeds the current allotted airtime minutes of the first pricing tier (i.e., 200 min), currently in effect. In one embodiment, network device(s) 110 may make a determination not to generate a recommendation (represented by a dashed downward arrow labeled "NO") since, under the terms of the plan, the charge associated with the excess 10 minutes would amount to $5, while the switch from the first pricing tier ($30) to the second pricing tier ($40) would cost the customer $10, the net effect being a cost to the customer of an extra $5.

At a later point in the second billing cycle, network device(s) 110 may determine—based on updated cumulative usage information generated from the in-cycle tracking—that device 115-X is presently on pace to use a total of 300 airtime minutes over the course of the second billing cycle, which is outside the range (0-200) of the first pricing tier currently in effect. Based on the updated usage rate, network device(s) 110 may make a determination to generate a recommendation (represented by a solid downward arrow labeled "YES") in a manner similar to that described above with respect to FIG. 2A. Assume here that the recommendation is for user device 115-X to be switched from the first pricing tier to the second pricing tier for the second billing cycle.

As illustrated in FIG. 2B, network device(s) 110 may present the recommendation to the customer via user device 115-X in a manner similar to that described above with respect to FIG. 2A. The customer may select from one of the recommendations presented (represented by a solid upward arrow) in a manner similar to that described above with respect to FIG. 2A. User device 115-X may send the customer's selection to network device(s) 110 and network device(s) 110 may provision the customer's selection in a manner similar to that described above with respect to FIG. 2A. As an example, the customer may select the second pricing tier for application to the second billing cycle on a permanent or recurring basis.

As illustrated in FIG. 2B, device 115-X may continue to be provided airtime minutes (represented by a solid downward arrow) in the second billing cycle, to be billed by network device(s) 110 at the level of the selected second pricing tier (i.e., $40) to cycle's end. In this example, the customer will have potentially saved the $50 in excess per-minute charges, minus the $10 difference between the plan fees, and minus any enrollment or one-time change fee of $5, for example, for a realized savings of $35 based on the switch in pricing plans.

Figure 2C:
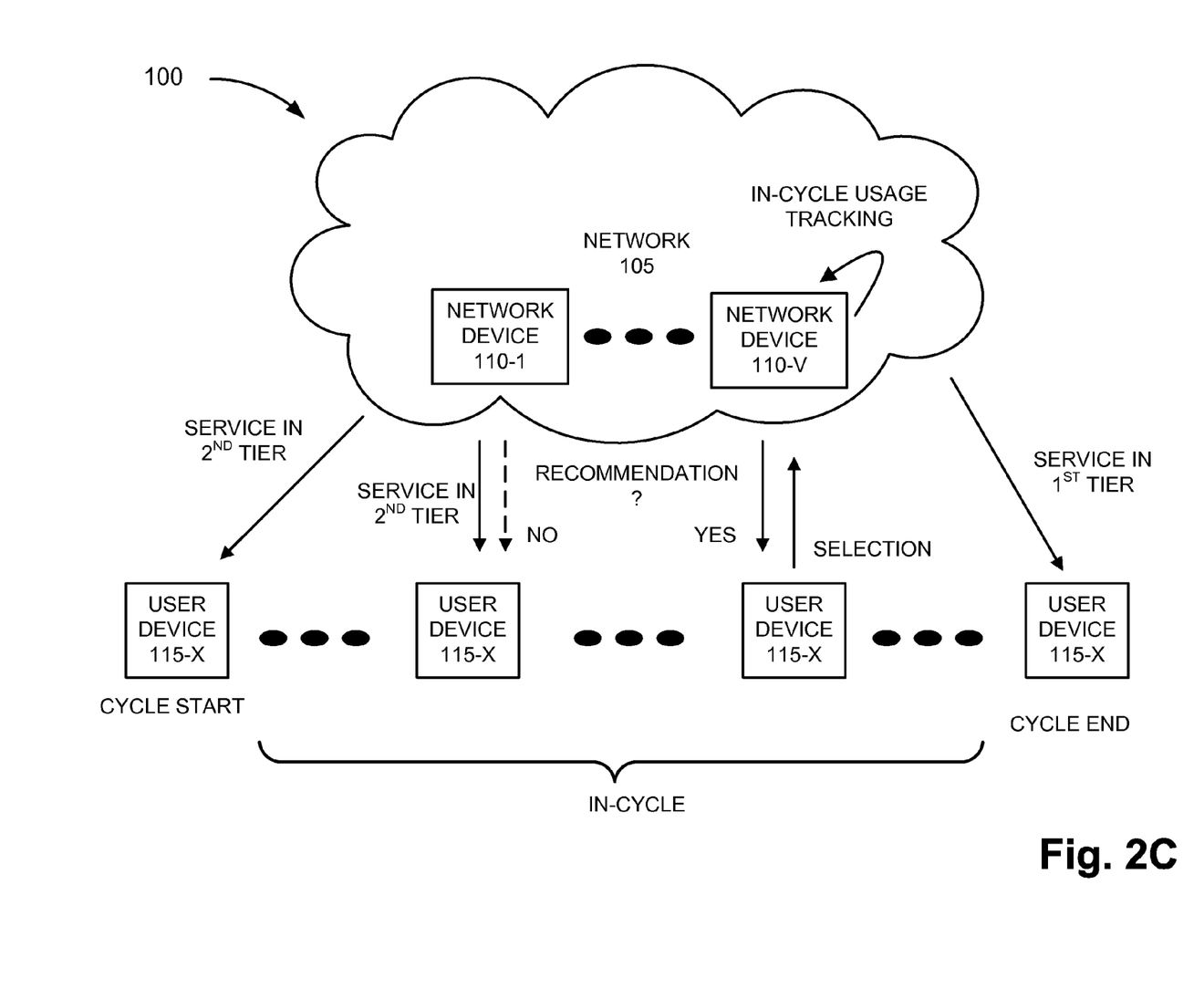

Referring to FIG. 2C, assume the same customer as in the examples given in FIGS. 2A and 2B, and a carryover of the second pricing tier to a subsequent, third billing cycle corresponding to a range of 201-400 airtime minutes of service (represented by a downward arrow). At the start of the third billing cycle, network device(s) 110 may again perform cumulative tracking of user device 115-X's usage of the allotted airtime minutes.

At a given point in the third billing cycle, network device(s) 110 may determine—based on cumulative usage information generated from the in-cycle tracking—that user device 115-X is presently on pace to use a total of 500 airtime minutes over the course of the third billing cycle, which falls outside the current range (201-400 airtime minutes allowed) of the second pricing tier, currently in effect.

In one embodiment, network device(s) 110 may analyze the cumulative usage information to determine a usage pattern. Network device(s) 110 may analyze the usage pattern to identify a potential anomaly or transient included in the cumulative minutes used. For example, one or more calls, received at and/or placed from user device 115-X, may account for a disproportionate number of the cumulative minutes used. In one embodiment, network device(s) 110 may automatically apply a weight (e.g., discount) to the used minutes associated with the flagged calls and recalculate the forecasted airtime minutes usage downward based on the reduced weighting given to the flagged calls. Based on the recalculated forecast, network device(s) 110 may make a determination not to generate a recommendation (represented by a dashed downward arrow labeled "NO"), based on the potential anomaly, when the recalculated usage is in the 201-400 airtime minutes range. In another embodiment, network device(s) 110 may report the potential anomaly to the customer (e.g., via user device 115-X) for confirmation and/or to determine a particular weighting factor to apply to the used minutes associated with the flagged calls.

At a later point in the third billing cycle, network device(s) 110 may determine based on updated cumulative usage information generated from the in-cycle tracking—that irrespective of the flagged calls, device 115-X is presently on pace to use a total of 500 airtime minutes over the course of the third billing cycle, which is outside the range (201-400) of the second pricing tier currently in effect. Based on the updated usage rate, network device(s) 110 may make a determination to generate a recommendation (represented by a solid downward arrow labeled "YES") in a manner similar to that described above with respect to FIGS. 2A and 2B. Assume here that the recommendation is for user device 115-X to be switched from the second pricing tier to the third pricing tier for the third billing cycle.

As illustrated in FIG. 2C, network device(s) 110 may present the recommendation to the customer via user device 115-X in a manner similar to that described above with respect to FIGS. 2A and 2B. The customer may select from one of the recommendations presented (represented by a solid upward arrow) in a manner similar to that described above with respect to FIGS. 2A and 2B. User device 115-X may send the customer's selection to network device(s) 110 for provisioning. As an example, the customer may select the third pricing tier to be in effect for the third billing cycle.

As illustrated in FIG. 2C, device 115-X may continue to be provided airtime minutes (represented by a solid downward arrow) in the third billing cycle, to be billed by network device(s) 110 at the level of the selected third pricing tier (i.e., $50) to cycle's end. In this example, the customer will have potentially saved the $50 in excess per-minute charges, minus the $10 difference between the plan fees, and minus any enrollment or one-time change fee of $5, for example, for a realized savings of $35 based on the switch in pricing plans.

Figure 2D:
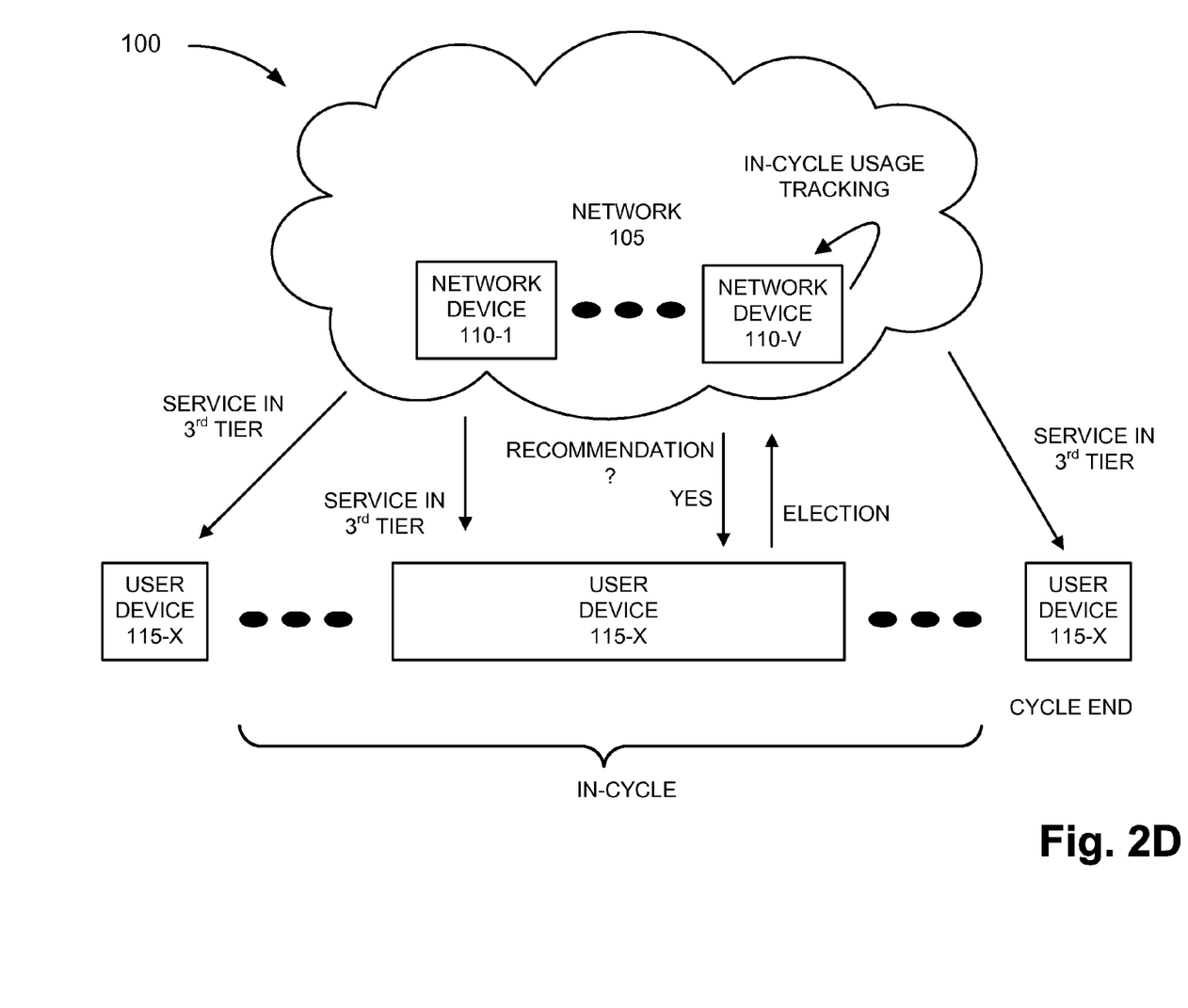

Referring to FIG. 2D, assume the same customer as in the examples given in FIGS. 2A-2C, and a carryover of the third pricing tier to a subsequent, fourth billing cycle corresponding to a range of 401-600 airtime minutes of service (represented by a downward arrow). At the start of the fourth billing cycle, network device(s) 110 may again perform cumulative tracking of user device 115-X's usage of the allotted airtime minutes.

At a given point in the fourth billing cycle, network device(s) 110 may determine—based on cumulative usage information generated from the in-cycle tracking—that user device 115-X is presently on pace to use a total of 700 airtime minutes over the course of the fourth billing cycle, which falls outside the current range (401-600 airtime minutes allowed) of the third pricing tier, currently in effect.

In one embodiment, network device(s) 110 may analyze the cumulative usage information to determine that a particular device identifier associated with one or more calls, received at and/or placed from user device 115-X, may account for a disproportionate number or percentage of the cumulative minutes (e.g., 40%, 65%, etc.) used beyond a particular threshold value. In one embodiment, network device(s) 110 may determine that the particular device identifier is not included in a list of a plurality of device identifiers that have been designated (e.g., under a friends/family/frequent contacts plan) by the customer as not to be counted against the allotted airtime minutes. Based on the determination, network device(s) 110 may make a determination to generate a recommendation (represented by a solid downward arrow labeled "YES") in a manner similar to that described above with respect to FIGS. 2A-2C. Assume here that the recommendation is for the particular device identifier to be added, for example, to the friends/family/frequent contacts or similar plan.

As illustrated in FIG. 2D, network device(s) 110 may present the recommendation to the customer via user device 115-X in a manner similar to that described above with respect to FIGS. 2A-2C. The customer may select from one of the recommendations presented (represented by a solid upward arrow) in a manner similar to that described above with respect to FIGS. 2A-2C. User device 115-X may send the customer's selection to network device(s) 110 for provisioning. As an example, the customer may elect to add the particular device identifier to be added, for example, to the friends/family/frequent contacts or similar plan. Based on the election, the airtime minutes usage may be forecasted downward to within the current range (401-600 airtime minutes allowed) of the third pricing tier, currently in effect. As illustrated in FIG. 2D, device 115-X may continue to be provided airtime minutes (represented by a solid downward arrow) in the fourth billing cycle, to be billed by network device(s) 110 at the level of the selected third pricing tier to cycle's end.

Figure 2E:
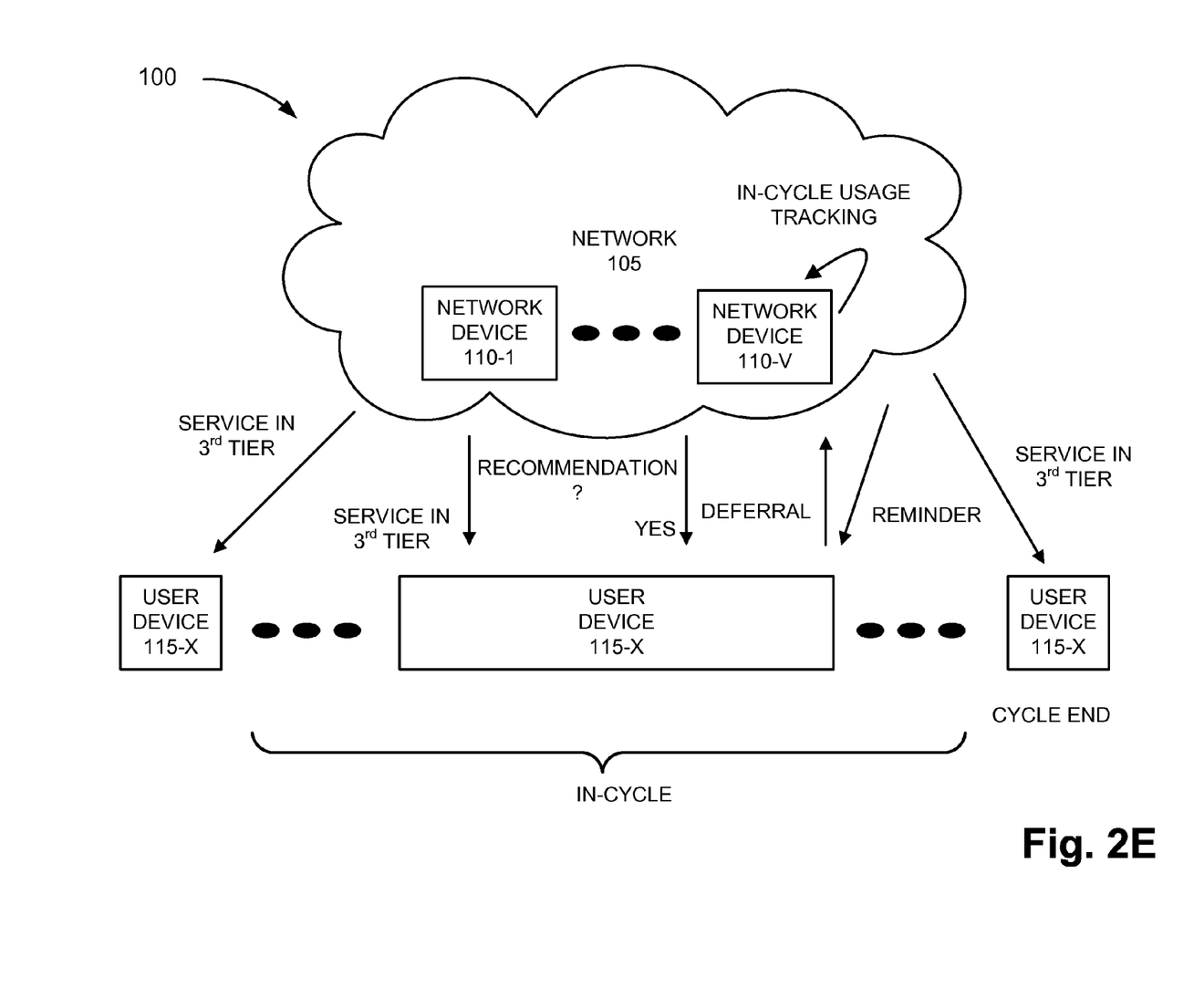

Referring to FIG. 2E, assume the same customer as in the examples given in FIGS. 2A-2D, and a carryover of the third pricing tier to a subsequent, fifth billing cycle corresponding to a range of 401-600 airtime minutes of service (represented by a downward arrow). At the start of the fifth billing cycle, network device(s) 110 may again perform cumulative tracking of user device 115-X's usage of the allotted airtime minutes.

At a given point in the fifth billing cycle, network device(s) 110 may analyze call logs for user device 115-X to determine an average call length (received at and/or placed from user device 115-X) associated with a particular device identifier. Network device(s) 110 may compare the average length to a particular threshold value. In one embodiment, network device(s) 110 may monitor incoming and outgoing calls from user device 115-X to identify the particular device identifier.

Based on the monitoring, network device(s) 110 may determine that an incoming call being received at or an outgoing call being placed via user device 115-X is associated with the particular device identifier and would be counted against the allotted airtime minutes. In one embodiment, network device(s) 110 may project, based on the average call length corresponding to the call, that the call may increase the cumulative usage rate to a level beyond the range corresponding to the particular pricing tier in effect. In another embodiment, network device(s) 110 may project, based on the average call length corresponding to the call, that the call may result in a tracked cumulative usage that exceeds the current range corresponding to the particular pricing tier in effect.

Based on either of the above projections, network device(s) 110 may make a determination to generate a recommendation (represented by a solid downward arrow labeled "YES") in a manner similar to that described above with respect to FIGS. 2A-2D. Assume here that the recommendation is for the customer to defer the (incoming or outgoing) call associated with the particular device identifier until such a time when the call would not be counted against the allotted airtime minutes. In one embodiment, the recommendation may correspond to a notification presented at placement of a call from the subscriber device to the one or more of the respective communication device identifiers and before the call is released to a network. The deferral may operate to prevent an unnecessary upgrade to a higher-priced plan.

As illustrated in FIG. 2E, network device(s) 110 may present the recommendation to the customer via user device 115-X in a manner similar to that described above with respect to FIGS. 2A-2D. The customer may select from one of the recommendations presented (represented by a solid upward arrow) in a manner similar to that described above with respect to FIGS. 2A-2D. User device 115-X may send the customer's selection to network device(s) 110 for provisioning. As an example, the customer may elect to defer answering the incoming call or releasing the outgoing call to network 105.

Based on the deferral, network device(s) 110 may set a reminder (represented by a solid upward arrow) to be presented to user device 115-X at a later time, for example, to return or a place a call to the particular device identifier at a time when the call would not be counted against the allotted airtime minutes (e.g., a reduced-rate time-of-day, weekend, and/or next billing cycle). As illustrated in FIG. 2E, device 115-X may continue to be provided airtime minutes (represented by a solid downward arrow) in the fifth billing cycle, to be billed by network device(s) 110 at the level of the selected third pricing tier to cycle's end.

In one embodiment, the recommendations may include a projected savings associated with switching pricing plans. In other embodiments, may designate one or more days (e.g., vacationing time) as exempt from the prospective or forecasted usage calculation. In still other embodiments, a customer may elect to forego the recommendations and instead to automatically switch pricing plans based on a projected savings of at least a particular threshold amount.

In view of the above-described embodiments, cumulative usage information may be collected and corresponding recommendations may be provided to customers to allow customers to exercise in-cycle control of pricing pertaining to applications and/or services. For example, customers may select service plans or other application and/or service-related parameters to dynamically order the provisioning of applications and/or services in a manner that more closely corresponds to the changing circumstances (e.g., either current or intended near-term future usage pattern) with respect to their service usage, monetary budgets, etc.

Additionally, although the above examples have been described in association with a particular customer, according to other embodiments, the cumulative tracking and generation of recommendations may be applied to aggregated customers (e.g., a family, employees of a business, etc.). In addition, although the above examples have been described in association with different billing cycles, any of the operations may occur in a single billing cycle, including a switch from a particular pricing and then back again. In one embodiment, a fee may be assessed for performing such a switch.

Figure 3:
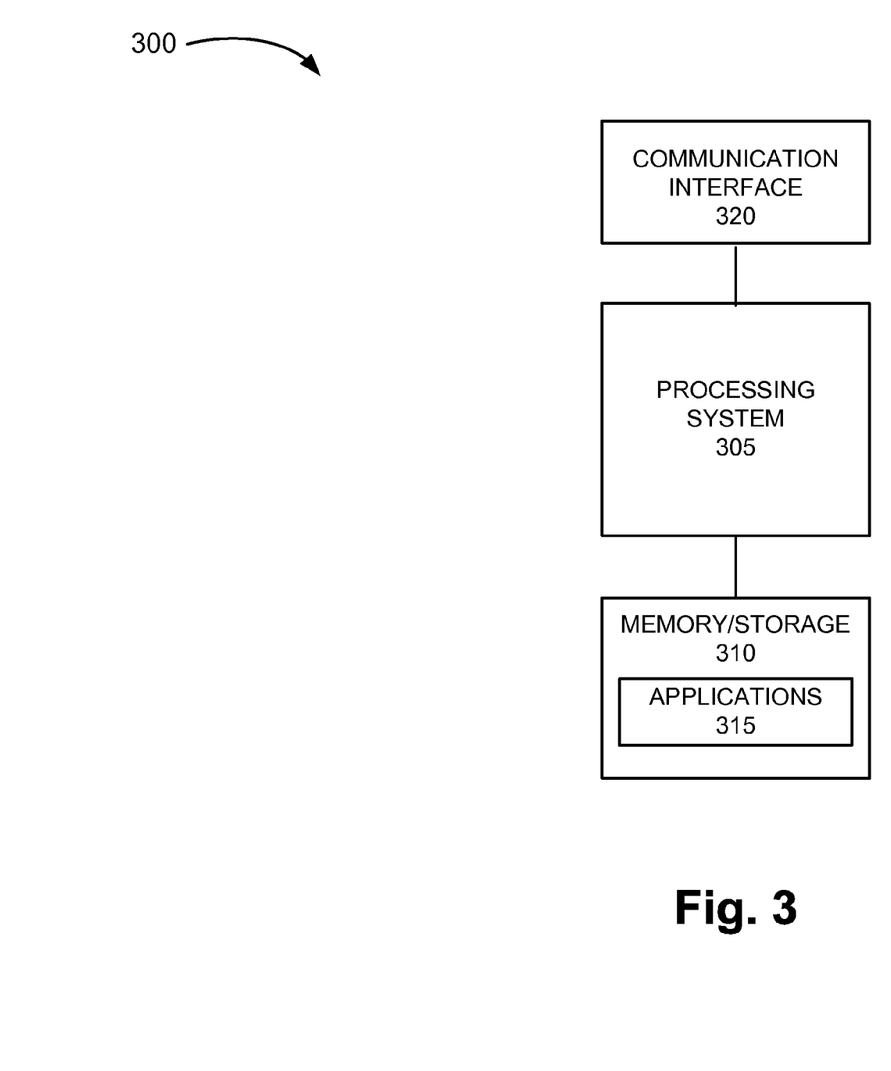
FIG. 3 is a diagram illustrating exemplary components of a device that may correspond to one or more of the devices in the environments depicted in FIG. 1 and FIGS. 2A-2E.

FIG. 3 is a diagram illustrating exemplary components of a device 300 that may correspond to one or more of the devices in environment 100. For example, device 300 may correspond to user device 115 and/or network device 110. As illustrated, device 300 may include a processing system 305, memory/storage 310 including applications 315, and a communication interface 320. According to other embodiments, device 300 may include fewer components, additional components, different components, and/or a different arrangement of components than those illustrated in FIG. 3 and described herein.

Processing system 305 may include one or multiple processors, microprocessors, data processors, co-processors, application specific integrated circuits (ASICs), controllers, programmable logic devices, chipsets, field programmable gate arrays (FPGAs), or some other component that may interpret and/or execute instructions and/or data. Processing system 305 may control the overall operation, or a portion of operation(s) performed by device 300. Processing system 305 may perform one or multiple operations based on an operating system and/or various applications (e.g., applications 315). Processing system 305 may access instructions from memory/storage 310, from other components of device 300, and/or from a source external to device 300 (e.g., another device, a network, etc.).

Memory/storage 310 may include one or multiple memories and/or one or multiple secondary storages. For example, memory/storage 310 may include a random access memory (RAM), a dynamic random access memory (DRAM), a read only memory (ROM), a programmable read only memory (PROM), a flash memory, and/or some other type of non-transitory storing medium (e.g., a computer-readable medium, a compact disk (CD), a digital versatile disk (DVD), or the like). Memory/storage 310 may include a hard disk (e.g., a magnetic disk, an optical disk, a magneto-optic disk, a solid state disk, etc.) or some other type non-transitory medium, along with a corresponding drive. Memory/storage 310 may be external to and/or removable from device 300, such as, for example, a Universal Serial Bus (USB) memory stick, a dongle, a hard disk, mass storage, off-line storage, or the like.

The term "computer-readable medium," as used herein, is intended to be broadly interpreted to include, for example, a memory, a secondary storage, a CD, a DVD, or another type of tangible storage medium. Memory/storage 310 may store data, application(s), and/or instructions related to the operation of device 300.

Applications 315 may include software that provides various services or functions. For example, applications 315 may include applications that perform various network-related and/or communication related functions. According to an exemplary embodiment, applications 315 may include one or multiple applications to implement the providing of recommendations based on cumulative usage information, as described herein. In one embodiment, applications 315 may include a plurality of forecasting models, including algorithms of varying complexity, providing multi-levels of comprehensiveness or sophistication associated with the respective forecasting models. In one embodiment, the level of comprehensiveness may be a default and/or may be selectable, for example, by the subscriber. For example, a lowest level of complexity may include determining an average cumulative usage during a billing cycle.

Communication interface 320 may permit device 300 to communicate with other devices, networks, systems and/or the like. Communication interface 320 may include one or multiple wireless interfaces and/or wired interfaces. Communication interface 320 may include one or multiple transmitters, receivers, and/or transceivers. Depending on the network, communication interface 320 may include interfaces according to one or multiple communication standards.

Device 300 may perform operations in response to processing system 305 executing software instructions stored memory/storage 310. For example, the software instructions may be read into memory/storage 310 from another memory/storage 310 or from another device via communication interface 320. The software instructions stored in memory/storage 310 may cause processing system 305 to perform processes described herein. Alternatively, according to another implementation, device 300 may perform processes based on the execution of hardware (e.g., processing system 305, etc.), the execution of hardware and firmware, or the execution of hardware, software (e.g., applications 315), and firmware.

As previously described, according to exemplary embodiments, network device(s) may provide tracking of cumulative usage of applications and/or services by user devices. Based on the cumulative usage information, network device(s) 110 may generate service and/or product-related recommendations and provide the recommendations to customers associated with the user devices.

Figure 4:
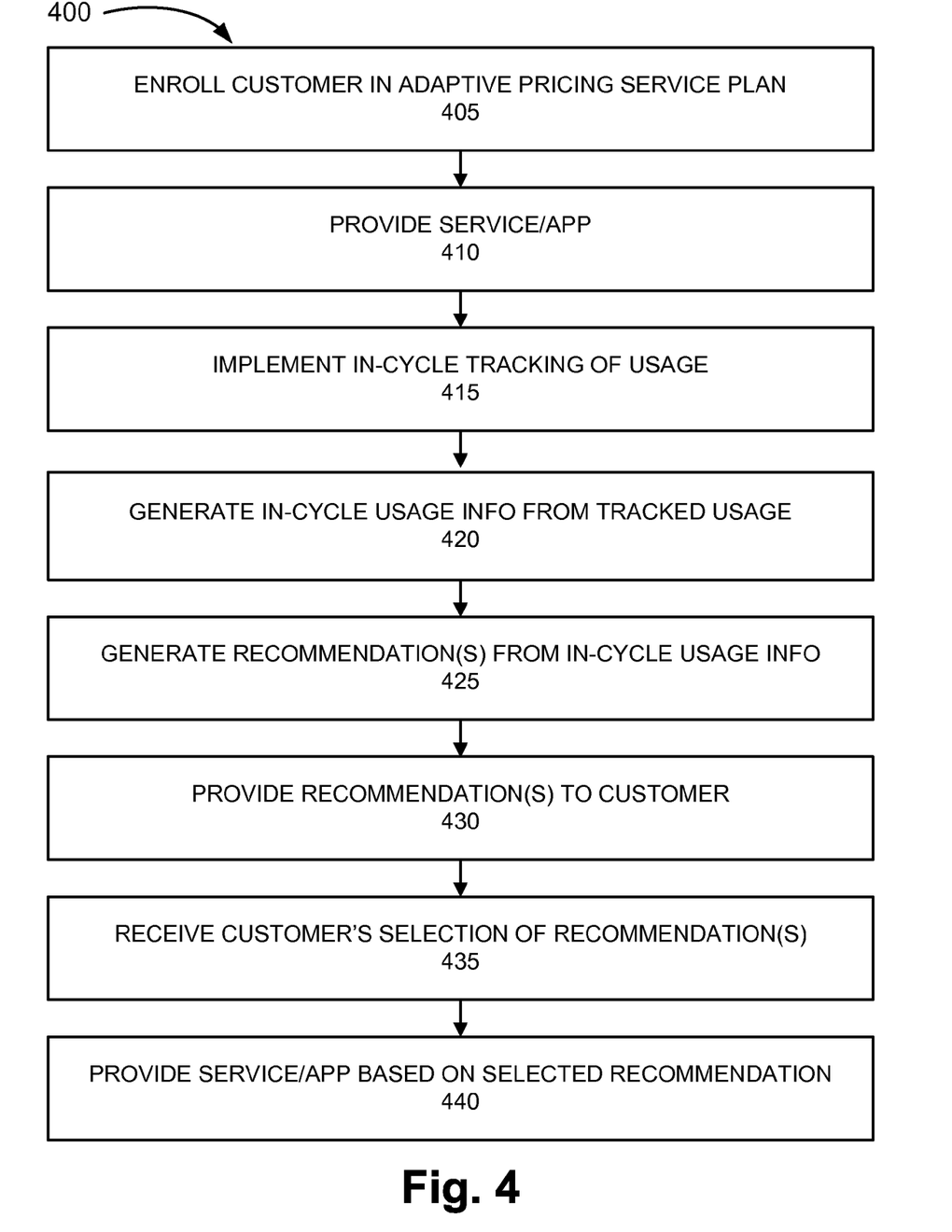
FIG. 4 is a flow diagram illustrating an exemplary process in which recommendations may be provided to customers based on cumulative usage information.

FIG. 4 is a flow diagram illustrating an exemplary process 400 in which recommendations may be provided to customers based on cumulative usage information. Process 400 may be performed in a network that includes, among other devices, new and/or modified interfaces relative to a communication standard and in relation to network devices of the network. The network may also use new and/or modified messaging to communicate data and/or information, as previously described.

Referring to FIG. 4, process 400 may include enrolling a subscriber and an associated subscriber device in an adaptive pricing service plan (block 405). After which, a customer may access the service and/or application via the subscriber device via a network, as described above. The service or the application may be provided (block 410). For example, as previously described, the network service provider (e.g., network device 110) may provide the requested application or service to the customer.

Cumulative in-cycle tracking may be implemented (block 415). For example, as previously described, the network may operate applications and/or services for tracking cumulative usage. Depending on the type of application or service, the network may select the appropriate tracking policies. For example, as previously described, the tracking policies may govern, among other things, whether the tracking is in terms of duration (e.g., cell minutes), bytes, etc. In one embodiment, the tracking operations may be ceased for a billing cycle when the remaining portion of the current billing cycle is less than a particular amount of the billing cycle (e.g., only weekend-days remain in the billing cycle).

Cumulative usage information may be generated based on tracked cumulative usage (block 420). For example, as previously described, the network (e.g., network device 110) may track the cumulative usage of the application and/or the service. The cumulative usage tracking may be based on the type of service or the type of application. For example, cumulative usage tracking of text messaging may include a transaction-based tracking corresponding to a mapping between the APN and the messaging service provided. The tracked usage data and/or information may be processed and cumulative usage information may be generated.

Recommendation(s) may be generated based on the in-cycle cumulative usage information (block 425). The recommendation(s) may include, for example, cumulative usage information, recommendation(s) pertaining to available service plans, service control options, etc., as previously described. For example, the recommendation(s) may include a recommendation pertaining to an upgrade in service, a downgrade in service, designations to a particular plan, deferring a call and/or service for a period of time, etc. The recommendation(s) may be sent to the customer (block 430), for example, as previously described, using one or multiple forms of communication.

The customer's selection of one of the recommendation(s) may be received via a network (block 435). For example, as previously described, the customer may select one of the recommendation(s) via the user device 115. The service and/or application may be provided according to the selected recommendation (block 440). For example, as previously described, the service provider may provision the customer's selection so that the service and/or application may be provided to the customer in accordance with the customer's selection. As an example, network device 110 may provide a service and bill the customer for an entire billing cycle based on a plan that was selected within the current billing cycle ("in-cycle").

Although FIG. 4 illustrates an exemplary process 400, according to other embodiments, process 400 may include additional operations, fewer operations, and/or different operations than those illustrated in FIG. 4 and described.

The foregoing description of implementations provides illustration, but is not intended to be exhaustive or to limit the implementations to the precise form disclosed. Accordingly, modifications to the implementations described herein may be possible.

The terms "a," "an," and "the" are intended to be interpreted to include one or more items. Further, the phrase "based on" is intended to be interpreted as "based, at least in part, on," unless explicitly stated otherwise. The term "and/or" is intended to be interpreted to include any and all combinations of one or more of the associated items.

The term "cumulative usage information," as used herein, is intended to be broadly interpreted to include, for example, information pertaining to usage of an application or a service. For example, cumulative usage information may include information pertaining to duration, data amount, number of messages or transactions, monetary balance, or other usage metrics related to the service or the application.

In addition, while a series of blocks have been described with regard to the process illustrated in FIG. 4 the order of the blocks may be modified in other implementations. Further, non-dependent blocks may be performed in parallel. Additionally, with respect to other processes described in this description, the order of operations may be different according to other implementations, and/or operations may be performed in parallel.

The embodiments described herein may be implemented in many different forms of software or firmware executed by hardware. For example, a process or a function may be implemented as "logic" or as a "component." The logic or the component may include, for example, hardware (e.g., processing system 305, etc.), a combination of hardware and software (e.g., applications 315), a combination of hardware and firmware, or a combination of hardware, software, and firmware. The implementation of software or firmware has been described without reference to the specific software code since software can be designed to implement the embodiments based on the description herein. Additionally, a non-transitory computer-readable medium may store instructions, which when executed, may perform processes and/or functions pertaining to the exemplary embodiments described herein.

In the preceding specification, various embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded as illustrative rather than restrictive.

No element, act, operation, or instruction described in the present application should be construed as critical or essential to the embodiments described herein unless explicitly described as such.

What is claimed is:

1. A method comprising:
   enrolling a subscriber device in an adaptive pricing service plan for providing telecommunication service to the subscriber device;
   associating, with the telecommunication service, a first pricing scheme including a first number of allotted minutes within a current billing cycle;
   tracking, for the subscriber device within the current billing cycle, cumulative used minutes of the telecommunication service;
   determining, using a forecasting model and the cumulative used minutes, prospective minutes usage with respect to the first number of allotted minutes for an entirety of the current billing cycle;
   generating, based on the prospective minutes usage, a recommendation related to a second pricing scheme including a second number of allotted minutes; and
   sending, within the current billing cycle, the recommendation to at least one of the subscriber device or another device associated with the subscriber device, wherein the sending comprises at least one of:
      sending the recommendation at placement of a call from the subscriber device to one or more communication device identifiers of a first set of communication device identifiers and before the placed call is released to a network, or
   presenting the recommendation when a call is received from one communication device identifier of the first set of communication device identifiers and before the received call is answered by the user.

2. The method of claim 1, further comprising:
   substituting, responsive to receiving input accepting the recommendation, the second pricing scheme for the first pricing scheme with respect to actual used minutes for the entirety of the current billing cycle.

3. The method of claim 2, further comprising:
   assessing, with respect to the subscriber device, a one-time fee related to the substitution.

4. The method of claim 1, further comprising:
   imposing, with respect to the subscriber device, a recurring fee related to a subscription to the adaptive pricing service plan.

5. The method of claim 1, wherein a first level of comprehensiveness is associated with the forecasting model, the method further comprising:
   receiving, with respect to the subscriber device, a selection of the first level of comprehensiveness from a plurality of levels of comprehensiveness.

6. The method of claim 1, further comprising:
   identifying, with respect to the cumulative used minutes, a call that corresponds to a potential anomaly, wherein determining the prospective minutes usage comprises adjusting the cumulative used minutes based on the identified call.

7. The method of claim 1, the method further comprising:
   determining, with respect to the cumulative used minutes usage, that at least one call corresponds to a potential anomaly; and
   presenting information, related to the at least one call, to a user associated with the subscriber device, for disposition with respect to determining the prospective minutes usage.

8. A non-transitory computer-readable medium comprising instructions executable by at least one processor, the instructions to cause the at least one processor to:
- track, for a subscriber device, usage of communication services provided under a subscription to a pricing service plan, over a portion of a current billing cycle;
- determine, based on the tracked usage, an in-cycle usage rate of the communication services;
- determine, based on the in-cycle usage rate, that prospective usage of the communication services over an entirety of the current billing cycle is on pace to:
  - be outside of a first pricing tier in effect at a beginning of the current billing cycle, and
  - correspond to a second pricing tier identified under the pricing service plan; and
- present, to a user of the subscriber device, an option to dynamically elect the second pricing tier over the first pricing tier, for use in billing for a total usage of the communication services at an end of the current billing cycle, wherein the instructions cause the at least one processor to, at east one of:
  - present the option at placement of a call from the subscriber device to one or more communication device identifiers of a first set of communication device identifiers and before the placed call is released to a network, or
  - present the option when a call is received from one communication device identifier of the first set of communication device identifiers and before the received call is answered by the user.

9. The computer-readable medium of claim 8, the instructions to cause the at least one processor to determine that the prospective usage is on pace to fall outside of the first pricing tier by determining that the prospective usage is on pace to fall outside of the first pricing tier by at least a threshold value.

10. The computer-readable medium of claim 8, the instructions to further cause the at least one processor to:
- receive, from the user, an indication that an identified communication event related to the tracked usage is to be weighted in determining the in-cycle usage rate.

11. The computer-readable medium of claim 10, wherein the indication is received in advance of the identified communication event.

12. The computer-readable medium of claim 8, the instructions to cause the at least one processor to track the usage only when the portion of the current billing cycle is less than a particular amount of the billing cycle.

13. The computer-readable medium of claim 8, the instructions to cause the at least one processor to determine the in-cycle usage rate by:
- determining a pattern of usage of the communication services,
- identifying a transient with respect to the pattern, and
- discounting the identified transient in determining the in-cycle usage rate.

14. The computer-readable medium of claim 8, wherein the communication services comprise at least two of a voice communication, a short message service (SMS) communication, or a multimedia messaging service (MMS) communication.

15. A method comprising:
- tracking, for a subscriber device, used minutes of a particular number of minutes allotted under a subscription to a service plan, related to communications with a plurality of communication devices identified by respective communication device identifiers;
- analyzing the used minutes to determine a proportion of the used minutes related to the communications corresponding to the respective communication device identifiers;
- determining that the proportion of the used minutes corresponding to each communication device identifier of a first set of the communication device identifiers exceeds a threshold value and that each communication device identifier of a second set of the communication device identifiers does not exceed the threshold value; and
- presenting, to a user of the subscriber device, a notification indicative of the first set of the communication device identifiers, wherein the presenting comprises at least one of:
  - presenting the notification at placement of a first call from the subscriber device to one or more communication device identifiers of the first set of communication device identifiers and before the first call is released to a network, or
  - presenting the notification when a call is received from one communication device identifier of the first set of communication device identifiers and before the received call is answered by the user.

16. The method of claim 15, wherein presenting the notification further comprises:
- not presenting the notification at placement of a second call from the subscriber device to one or more communication device identifier of the second set of communication identifiers before the second call is released to the network.

17. The method of claim 15, wherein presenting the notification comprises:
- providing, to the user, a recommendation for deferral of the placement of the first call to a time at which the first call would not be related to the particular number of minutes allotted under the subscription, and
- setting, responsive to receiving input from the user accepting the recommendation, a reminder to the subscriber device regarding the placement of the first call at the deferred time.

18. The method of claim 15, wherein presenting the notification comprises:
- providing, to the user, a recommendation for deferral of the call to a time at which the call would not be related to the particular number of minutes allotted under the subscription, and
- setting, responsive to receiving input from the user accepting the recommendation, a reminder to the subscriber device at the deferred time regarding the call.

* * * * *